United States Patent

Schmidt

[11] Patent Number: 5,100,494
[45] Date of Patent: Mar. 31, 1992

[54] STRUCTURAL BONDING AND DEBONDING SYSTEM

[75] Inventor: Gustav A. Schmidt, South Pasadena, Calif.

[73] Assignee: Hughes Aircraft Company, Los Angeles, Calif.

[21] Appl. No.: 649,119

[22] Filed: Jan. 28, 1991

Related U.S. Application Data

[63] Continuation of Ser. No. 402,304, Sep. 5, 1989, abandoned.

[51] Int. Cl.⁵ .............................. B32B 7/06; B32B 1/08
[52] U.S. Cl. .................................. 156/344; 156/304.2; 156/584; 29/426.4; 219/535; 219/544; 285/41
[58] Field of Search ..................... 219/203, 544, 535; 29/426.4; 52/127.1; 156/107, 108, 155, 584, 344, 99, 109, 304.2; 285/41

[56] References Cited

U.S. PATENT DOCUMENTS

| | | | |
|---|---|---|---|
| 3,378,672 | 3/1966 | Blumenkranz | 219/535 X |
| 3,527,663 | 9/1970 | Rose et al. | 156/273.9 X |
| 3,542,619 | 11/1970 | McManus | 156/273.9 X |
| 3,573,149 | 3/1971 | Tibble et al. | 156/107 X |
| 3,574,024 | 4/1971 | Rose | 156/273.9 X |
| 3,795,047 | 3/1974 | Abolafia et al. | 156/276 X |
| 4,131,980 | 1/1979 | Zinnbauer | 29/463 |
| 4,184,000 | 1/1980 | Denman | 156/273.9 X |
| 4,555,607 | 11/1985 | Roentgen et al. | 156/273.9 X |
| 4,698,409 | 10/1987 | Goel | 528/73 |
| 4,803,021 | 2/1989 | Werth et al. | 264/25 |

FOREIGN PATENT DOCUMENTS

0625063  8/1978  U.S.S.R. ............................... 156/276

Primary Examiner—Michael W. Ball
Assistant Examiner—Mark A. Osele
Attorney, Agent, or Firm—C. D. Brown; R. M. Heald; W. K. Denson-Low

[57] ABSTRACT

Two pieces (12 and 14) of material are releasably bonded together with a thermoplastic adhesive (28) in which a heating element (30) is embedded. After application, the adhesive (28) cures at ambient temperature or at a low elevated temperature produced by passing an electrical current through the heating element (30), to bond the pieces (12 and 14) together. The pieces (12 and 14) are debonded or separated by passing a relatively high electrical power through the heating element (30), to soften or melt the adhesive (28). A preferred adhesive (28) is a cyanoacrylate.

12 Claims, 1 Drawing Sheet

STRUCTURAL BONDING AND DEBONDING SYSTEM

This is a continuation of application Ser. No. 07/402,304 filed Sep. 5, 1989 now abandoned.

BACKGROUND OF THE DISCLOSURE

This invention relates to the structural bonding of pieces of material, and, more particularly, to an approach for adhesively bonding and then, at a later time, debonding the pieces.

The joining of pieces of materials is an operation common to nearly all manufacturing processes. One important type of joining is structural joining, where the joint must be sufficiently strong to bear the structural loadings carried by the pieces themselves. For many years, the most common approach to structural joining was the use of point fasteners, such as rivets, screws, and bolts.

More recently, the use of structural adhesives has become more common, and many parts for defense and commercial applications are now bonded together with adhesives. While an adhesive normally is not as strong at a single location as a point fastener, the adhesive spreads the structural load carried by the joint over a large area so that a lower strength adhesive is easily sufficient. A structural adhesive joint has the additional advantages that the joint is sealed by the adhesive, the joint is normally resistant to environmental attack by water and many chemicals, and the joint has reduced incidence of stress concentrations that often lead to fatigue failure in pieces joined by point fasteners.

However, adhesive bonding has a major shortcoming when compared to joining with removable fasteners such as screws, bolts, and some types of rivets. It may be desirable to join the pieces together for some purpose, such as testing, and then later separate the pieces, as for inspection of the interior of the structure. Such joining and separation are readily accomplished with many removable fasteners, but not with structural adhesive bonds.

Because of the advantages of adhesive bonding, there is a need for an approach that permits bonding of pieces with structural adhesives and later debonding the pieces, without damaging the pieces that are bonded or sensitive apparatus located nearby. The present invention fulfills this need, and further provides related advantages.

SUMMARY OF THE INVENTION

The present invention provides a joining approach that permits bonding of two pieces using a structural adhesive, and then later debonding and separating the pieces. The approach does not require alteration of the pieces themselves, and is widely applicable. The well-known advantages of structural adhesive bonding, including distribution of loads, corrosion resistance, and sealing of the joint are retained. Debonding does not require the use of potentially dangerous or corrosive chemicals, or widespread heating of the bonded parts. In circumstances where the pieces bonded form a container for sensitive components such as electronic components, the present approach allows the container to be sealed with the components therein, the components and container to be tested, and then the container to be opened for inspection of the components, all without subjecting the components to overheating or other types of damage. The releasable bonding system of the invention can then be replaced with a permanent structural adhesive or a fastener bond for permanent service, if desired.

In accordance with the invention, a bonded structure comprises two pieces of material that are bonded together; and a joint between the two pieces of material, the joint including a layer of a thermoplastic adhesive, and an electrical resistance element between the two pieces. Preferably, the resistance element is embedded within the adhesive, with a layer of the adhesive on either side, but it need not be so positioned.

Any of several approaches can be used to form the joint. In the preferred approach, a layer of the thermoplastic adhesive is coated to one side of an electrical resistance ribbon, which is then pressed into the adhesive layer and the adhesive cured. The exposed face of the resistance ribbon is coated with another layer of the thermoplastic adhesive, and bonded to a face of the other piece being bonded, by pressing the face to the coated ribbon and curing the structure. If a mildly elevated temperature is helpful in curing the adhesive, a low power level electrical current may be passed through the heating element to effect such heating during curing. Glass beads may be placed between the ribbon and the face of the piece to maintain a precise spacing and thickness of the adhesive layer, in each case. Other bonding approaches, such as coating the faces of the pieces with adhesive and then pressing the resistance element between them, are also operable.

At a later time, the joint is debonded by passing a sufficiently high electrical power through the heating element that the thermoplastic adhesive softens and/or melts, permitting the bonded pieces to be separated. An advantage of this approach is that the heating of the bonded pieces during debonding occurs only in the region where it is needed, the joint. The entire bonded structure, and its contents, if any, need not be heated in an oven to effect debonding. There may be some conductive heating of adjacent portions of the pieces and nearby structure or components, but testing has shown that this potential source of damage is minimized by accomplishing the debonding rapidly with a relatively high heat input rate to the heating element.

A variety of thermoplastic adhesives may be used, but the presently preferred adhesive is a cyanoacrylate that has a low melting point of about 150° C. A polymeric material, such as polymethyl methacrylate, may be added to the cyanoacrylate adhesive before formation of the bond to modify its viscosity as needed for easy application. Selection of other thermoplastic adhesives and modifiers may be made to attain particular combinations of strength and debonding temperature.

The approach of the invention therefore represents an advance in the art of structural bonding, particularly as related to processes wherein pieces are bonded and then later debonded. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

In accordance with the invention, a process for releasably joining two pieces of material comprises the steps of furnishing two pieces of material having conformably shaped facing surfaces; and bonding the two pieces of material together at a joint, the joint including a layer of a thermoplastic adhesive, and an electrical resistance element between the pieces. In the related use, a process for temporarily joining and then separating two pieces of material comprises the steps of furnishing two pieces of material having conformably shaped facing surfaces; bonding the two pieces of material together at a joint, the joint including a layer of a thermoplastic adhesive, and an electrical resistance element between the pieces; and passing a sufficient electrical current through the resistance element to melt the thermoplastic adhesive, thereby separating the two pieces.

Figure 1:
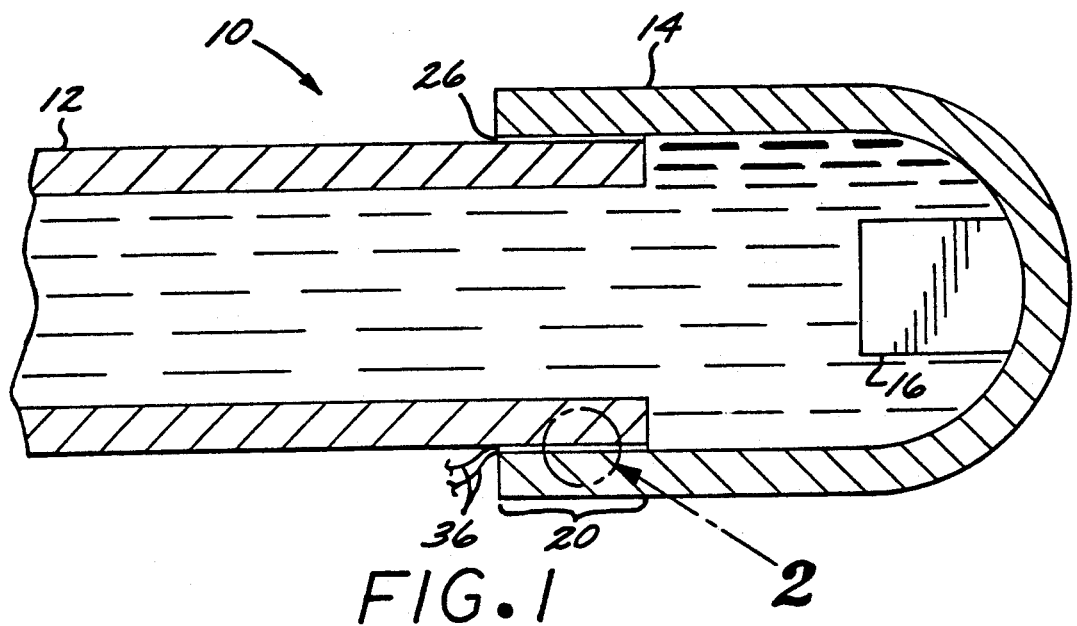
FIG. 1 is a side sectional view of two pieces joined by the approach of the invention.

FIG. 1 illustrates a structure 10 that is releasably bonded using the approach of the invention. The structure 10 includes a first piece 12, here the body of a cylindrically symmetric projectile, and a second piece 14, here the nose piece for the projectile. The structure 10 contains electronic components 16 and is filled with a fluorocarbon liquid 18. The structure 10 must be sealed with the electronic components 16 inside and the fluorocarbon liquid 18 added, and then subjected to a variety of tests. After the testing is complete, the structure 10 is opened so that the interior of the structure 10 and the electronic components 16 may be inspected.

Figure 2:
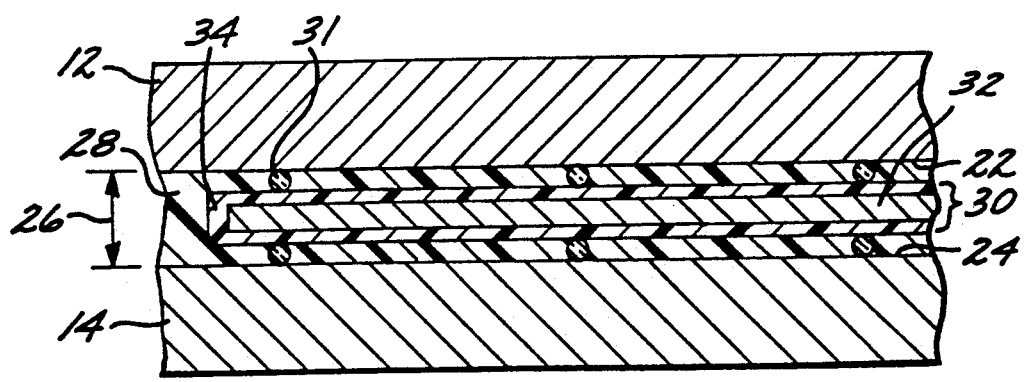
FIG. 2 is an enlarged detail of the pieces and the joint of FIG. 1, taken generally in the area 2.

The pieces 12 and 14 are to be bonded in a bonding region 20, whose structure is shown in greater detail in FIG. 2. In this region 20, the pieces 12 and 14 have facing surfaces 22 and 24, respectively, that are conformable in the sense that they have shapes and dimensions that result in a relatively small gap 26 between them. The gap 26 is typically from about 0.004 to about 0.010 inches in width.

To accomplish the bonding, a layer of a fluid thermoplastic adhesive 28 is coated onto one side of a heating element 30, and that side is contacted to one of the facing surfaces 22 or 24 to be bonded. That bond is cured in the manner recommended for the adhesive. The other side of the heating element 30 is then coated with another layer of the thermoplastic adhesive, and contacted to the other of the facing surfaces 22 or 24 to be bonded, resulting in assembly of the structure 10. The second bond is cured in the manner recommended for the adhesive. To ensure that the heating element 30 is separated and spaced apart from each piece 12 and 14, small glass beads 31 of diameters of from about 0.002 to about 0.010 inches are optionally placed between and contacting the heating element 30 and the facing surface 22 and 24 as the respective bond is formed.

The preferred heating element 30 includes a Nichrome V resistance ribbon 32 enclosed in a polyimide insulator 34. The Nichrome V resistance ribbon used in several working embodiments of the invention has a composition of 61 weight percent nickel, 15 weight percent chromium, balance iron. Other types of resistance wires can also be used. The layer of thermoplastic adhesive is a dielectric, and therefore it is acceptable that the resistance element 32 be uninsulated as long as contact between the element 32 and the pieces 12 and 14 can be reliably prevented. However, to ensure that no contact can occur, in the preferred approach the Nichrome V resistance ribbon 32 is encapsulated in a polyimide insulator such as Hitachi 3500, which is applied in a multiple coating procedure and then cured at 300° C. for 30 minutes.

Various power capacities of heating ribbons 32 (or alternatively, wires) are commercially available in thickness of from about 0.002 to about 0.010 inches and arbitrarily large widths from companies such as MWS Wire Industries, Westlake Village, Calif. and California Fine Wire Company, Grover City, Calif. Experiments with heating elements of this type have shown that the heating element can be heated to a temperature of 150° C. in about 3-15 seconds with an applied voltage of about 5-10 volts.

The heating element 30 is wound around the piece 12 of smaller diameter, and the piece 14 is then slipped over the piece 12 to the extent that the surfaces 22 and 24 are facing each other in the bonding region 20. This assembly of the structure 10 is performed as previously described. A pair of leads 36 is positioned to extend out of the bonding region 20 so that electrical power can be supplied to the heating element 30.

As shown in FIG. 2, the heating element 30 typically resides generally in the center of the gap 26 between the pieces 12 and 14, with adhesive between the surface 22 and the heating element 30, and between the surface 24 and the heating element 30. (If there is more than one heating element 30, there is adhesive between the lingitudinally adjacent heating elements 30). This arrangement produces a good mechanical bond and a liquid-tight seal between the pieces 12 and 14. The approach of the invention is operable when the resistance element is placed anywhere between the pieces 12 and 14, and may be closer to one piece than the other, and even in direct contact with one of the pieces or the other. The placement of the resistance element in the center of the bond line is preferred, because heating of the pieces 12 and 14 is minimized.

The thermoplastic adhesive can be of any type that sets at a low temperature, such as ambient temperature or a slightly elevated temperature, and then softens and/or melts at higher elevated temperature. Although it is not so restricted, the presently preferred thermoplastic adhesive is a cyanoacrylate, whose polymerized structure is generally represented as:

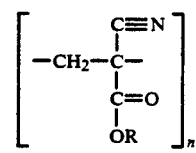

where the alkoxy group can be methoxy or ethoxy with the addition of an R such as $CH_3$ or $C_2H_5$.

The cyanoacrylate may have a consistency that is too fluid to be easily applied in the bonding operation. To increase its viscosity, a suitable amount of a high molecular weight polymer such as an acrylic polymer may be mixed into the cyanoacrylate prior to its polymerization. Although it is not so restricted, the presently preferred acrylic polymer is of the form:

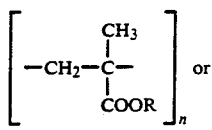

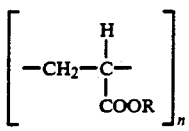

where R is $CH_3$ or $C_2H_5$. In all three of the above formulas, n is greater than two and end groups are preferably methyl groups.

Other additives may be introduced into the adhesive. For example, high surface area silica (silicon dioxide) particles may be added to the adhesive mixture, before curing, to increase the viscosity of the adhesive.

Additives to the thermoplastic adhesive (here the cyanoacrylate) generally have two distinct but interrelated effects. First, the additives alter the viscosity of the uncured adhesive, so that the uncured adhesive may be worked more easily. Second, the additives alter the curing time of the thermoplastic adhesive. Both of these factors are primarily engineering considerations. If the adhesive mixture has too low a viscosity, it has a watery consistency and cannot be readily contained in the proper place prior to curing. The viscosity may also play a part in the time to achieve curing. Normally, the more viscous the adhesive, the longer the curing time. A short curing time may be unacceptable if a large or complex part is to be bonded by the approach of the invention. The additives, such as acrylic polymer or silica, can be added in various amounts to alter the viscosity and curing time as required for particular applications, without changing the basic way in which the adhesive functions. Alternatively, different commercial formulations of cyanoacrylates, already having viscosity modifiers added, can be mixed together.

Cyanoacrylates are available commercially from a variety of sources. For example, cyanoacrylates of various viscosities and curing times are available from 3M Corporation as its CA series of Scotch-Weld® products. According to the product literature for this series of products, the variants are available having viscosities from 2 to 3000 centipoise (cps).

The use of a cyanoacrylate adhesive layer is preferred for use in bonding two aluminum or titanium pieces 12 and 14. Any other thermoplastic adhesive can also be used, and other such adhesives may be used where the pieces 12 and 14 are made of other materials. Polyurethanes, polyamides, vinyls, polyesters, and polyolefins are examples of the types of adhesives that may be used in particular circumstances. Thermoplastics that act as adhesives to different types of materials are known, rendering the approach of the invention highly versatile.

When the pieces 12 and 14 are to be debonded, an external voltage is applied between the leads 36 so that an electrical current flows through the resistance ribbon 32. The heating elements 30 are constructed so that they heat up with the passage of the electrical current, thereby heating the adjacent adhesive 28. When a sufficiently high level of voltage and current (power) is passed through the heating element 30, the adhesive 28 exceeds its softening or melting temperature. The adhesive 28 can no longer carry a mechanical load in this state, and the pieces 12 and 14 are readily separated to complete the debonding separation.

The power level required by the heating elements 30 during debonding depends upon the softening or melting temperature of the thermoplastic adhesive, the physical size of the region to be heated, and the thermal conductivities of the materials used in the pieces 12 and 14. Thus, if the pieces 12 and 14 are aluminum, more power and heating are required, because some of the heat produced by the heating element 30 diffuses away into the pieces 12 and 14. If the pieces 12 and 14 are metals of lower thermal conductivity, such as titanium, then less power is required. In either event, an important advantage of the present invention is that the entire structure 10 does not have to be heated, as in a furnace. Such heating of the entire structure would likely damage the electronic components 16 and possibly decompose the fluorocarbon liquid 18 contained within the structure 10.

The following examples illustrate aspects of the application of the invention, and should not be taken as limiting the invention in any respect.

EXAMPLE 1

A series of flat samples were prepared to determine setting times and shear strength of various adhesive mixtures. To formulate the mixtures, three components were used. Assure ™ adhesive is a cyanoacrylate adhesive having a viscosity of about 80 cps and relatively slow curing time, manufactured by Loctite Corp., Newington, Conn. Pronto ™ A8 adhesive is a cyanoacrylate adhesive having a viscosity of less than 80 cps and a relatively fast curing time, manufactured by 3M Corporation, St. Paul, Minn. The viscosities of these adhesives is a fully sufficient characterization of their properties for the present use, and detailed knowledge of their compositions is not required. Cab-O-Sil ™ powder is a high surface area silica powder available from Cabot Corporation, Tuscola, Ill.

Various mixtures of the cyanoacrylate formulations and silica powder were prepared, and coated onto 1 inch by 1 inch substrate regions of panels of titanium or aluminum. No resistance element was placed in the bond. The bonds were cured, and then tested to determine their shear strengths.

In the following table, the amounts of the cyanoacrylates and silica are in percent by weight, the shear strength is in pounds per square inch (psi), and aluminum is indicated as "Al" and titanium as "Ti".

TABLE 1

| Assure % | Pronto % | Cab-O Sil % | Shear Strength | Substrate |
| --- | --- | --- | --- | --- |
| 0 | 100 | 0 | 1870 | Al |
| 100 | 0 | 0 | 195 | Al |
| 8.3 | 83.4 | 8.3 | 1450 | Al |
| 50 | 50 | 0 | 560 | Al |
| 57.1 | 37.5 | 5.4 | 503 | Al |
| 78.7 | 21.3 | 0 | 268 | Al |
| 43.5 | 52.5 | 4.2 | 786 | Al |
| 42.5 | 52.8 | 4.7 | 587 | Al |
| 42.5 | 52.7 | 4.7 | 637 | Ti |
| 32.2 | 64.5 | 3.3 | 925 | Al |

An adhesive having only Pronto, with neither other component, required 1 minute to cure to a hard set (which is of sufficient strength for touching and handling, but not fully cured strength). The adhesive having 83.4 percent Pronto required 3 minutes to cure to a hard set. The availability of a range of setting times is desirable, because some applications, typically for bonding small areas, may require fast setting times, while other applications, typically for bonding large areas, may require slower setting times.

These results demonstrate that various formulations of various strength can be prepared, and that various types of substrates can be bonded with the approach of the invention.

EXAMPLE 2

Example 1 was repeated with a formulation of 42.5 percent by weight Assure, 52.8 percent by weight Pronto, and 4.7 percent by weight Cab-O-Sil. In one case, two titanium substrates were bonded together, and in the second case two aluminum substrates were bonded together. After bonding, the substrates were immersed in the inert hydrocarbon liquid Fluorinert 70 for seven days, and then tested. The shear strength of the titanium piece was 738 psi, and the shear strength of the aluminum piece was 873 psi. These strengths are comparable with the strengths achieved without the hydrocarbon immersion and in fact slightly superior, probably due to the longer curing time.

EXAMPLE 3

Example 1 was repeated, except with the change indicated below, using a formulation of 39.7 percent by weight Assure, 48.3 percent weight Pronto, and 12 percent by weight Cab-O-Sil. The substrates were titanium, and the bonded area was ½ square inch. A Nichrome V ribbon was placed between the pieces being bonded and embedded in the adhesive prior to curing, in the manner described earlier. The shear strength was measured as 515 psi.

EXAMPLE 4

Bonding and debonding were quantitatively evaluated using bonded titanium test panels, each having a bonded surface 1 inch by 1 inch, and a thickness of 0.060 inches. The panels were cleaned and one of the surfaces to be bonded was coated with a thin layer of the preferred cyanoacrylate thermoplastic adhesive having a formulation of 42.4 percent by weight Assure, 53 percent by weight Pronto, and 4.6 percent by weight Cab-O-Sil silica. A 1½ inch long, ½ inch wide nichrome heating ribbon of thickness 0.002 inches was placed into the adhesive. Some glass beads of diameter 0.005 inches were incorporated onto the cyanoacrylate resin surface as spacers to fix the gap between the surface of each piece being bonded and the heating element at 0.005 inches. This procedure was repeated for the other face being bonded. The test panels were cured for five days at ambient temperature to set the thermoplastic adhesive.

To test debonding, one of the panels was suspended vertically from a support, and a one-pound weight was suspended from the other (bonded) test panel. The panels were instrumented with two thermocouples, one on the Nichrome V ribbon heating element and the other on one panel approximately ½ inch from the bonded region.

A voltage of 4.5 volts was applied between the leads of the heating element, which resulted in a current of about 22 amperes, and the temperatures and time to debonding were recorded.

A first specimen had a large flashing due to excess adhesive in the bonding region. It required 47 seconds to debond. The heating element reached a temperature of 317° C. and the thermocouple ½ inch from the bonded region had a temperature of 54° C.

Based upon the experience gained from the first specimen, five other specimens were prepared with a proper amount of adhesive in the bond line, so that there was no excessive flashing. For these five specimens, the time to debonding ranged from 17 to 24 seconds. The temperature of the heating element ranged from 113° to 167° C., and the temperature ½ inch from the bonding region ranged from 35° to 47° C. These times and temperatures were judged acceptable for achieving debonding of structures containing heat-sensitive electronic components in the manner illustrated in FIG. 1, while maintaining a low temperature in adjacent regions to avoid damage to the components.

Thus, the present invention provides a straightforward, reproducible approach for bonding and then debonding structures. Although particular embodiments of the invention have been described in detail for purposes of illustration, various modifications may be made without departing from the spirit and scope of the invention. Accordingly, the invention is not to be limited except as by the appended claims.

What is claimed is:

1. A bonded structure, comprising:
   two pieces of material that are bonded together; and
   a joint between the two pieces of material, the joint including
   a layer of a thermoplastic adhesive,
   an electrical resistance element between the two pieces, and
   means for centering the electrical resistance element between the two pieces of material that are bonded together, wherein the means for centering contact the two pieces of material.

2. The structure of claim 1, wherein the resistance element is embedded within the adhesive.

3. The structure of claim 1, wherein the two pieces of material are each metals.

4. The structure of claim 1, wherein both of the two pieces of material are cylindrical, and dimensioned so that one slides inside the other.

5. The structure of claim 1, wherein the thermoplastic adhesive includes a cyanoacrylate.

6. The structure of claim 1, wherein the thermoplastic adhesive includes a mixture of a cyanoacrylate and an acrylic polymer.

7. The structure of claim 1, wherein the thermoplastic adhesive includes a mixture of two cyanoacrylate-containing mixtures each having a different viscosity.

8. The bonded structure of claim 1, wherein the electrical resistance element includes an electrically conductive wire surrounded by an insulator.

9. A process for temporarily joining and then separating two pieces of material, comprising the steps of:
   furnishing two pieces of material having conformably shaped facing surfaces;
   bonding the two pieces of material together at a joint, the joint including
   a layer of thermoplastic adhesive,
   an electrical resistance element between the two pieces; and
   means for separating and spacing the electrical resistance element apart from each of the two pieces of material that are bonded together, the means for separating and spacing apart including a plurality of nonconductive spacers placed between the electrical resistance element and the pieces of material on each side of the electrical resistance element; and passing a sufficient electrical current through the resistance element to melt the thermoplastic adhesive, thereby separating the two pieces.

10. The process of claim 9, wherein the thermoplastic adhesive includes a cyanoacrylate.

11. The process of claim 9, wherein the thermoplastic adhesive includes a mixture of a cyanoacrylate and an acrylic polymer.

12. A bonded structure, comprising:
two pieces of material that are bonded together; and
a joint between the two pieces of material, the joint including
a layer of a thermoplastic adhesive,
an electrical resistance element between the two pieces, the resistance element comprising an electrically conducting element and an insulator overlying the electrically conducting element; and
means for separating and spacing the electrical resistance element apart from each of the two pieces of material that are bonded together, the means for separating and spacing being a different structural element from the insulator on the electrically conducting element.

* * * * *